(12) United States Patent
Clark

(10) Patent No.: US 9,770,954 B1
(45) Date of Patent: *Sep. 26, 2017

(54) SELF-ALIGNING WHEELED TRAILER CONNECTING MECHANISM

(71) Applicant: Donald P. Clark, Tucson, AZ (US)

(72) Inventor: Donald P. Clark, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,047

(22) Filed: Apr. 3, 2017

Related U.S. Application Data

(63) Continuation-in-part of application No. 14/818,656, filed on Aug. 5, 2015, now Pat. No. 9,643,669.

(51) Int. Cl.
*B60D 1/50* (2006.01)
*B60D 1/36* (2006.01)
*B60D 1/56* (2006.01)

(52) U.S. Cl.
CPC .............. *B60D 1/363* (2013.01); *B60D 1/50* (2013.01); *B60D 1/56* (2013.01)

(58) Field of Classification Search
CPC .. B60D 1/363; B60D 1/50; B60D 1/56; B60R 9/00; B60R 9/06
See application file for complete search history.

(56) References Cited

U.S. PATENT DOCUMENTS

| | | | |
|---|---|---|---|
| 3,000,652 A | 9/1961 | Hawkins | 267/293 |
| 3,410,571 A | 11/1968 | Muriel | 280/103 |
| 3,419,285 A | 12/1968 | Morehouse | 280/446.1 |
| 3,461,264 A | 8/1969 | Sims | 219/160 |
| 3,640,192 A | 2/1972 | Mauldin | 280/43.23 |
| 3,690,397 A | 9/1972 | Parker | 180/19.1 |
| 4,266,795 A | 5/1981 | Walker | 280/402 |
| 4,438,945 A | 3/1984 | Curtis | 280/491.5 |
| 5,029,740 A | 7/1991 | Cox | 280/415.1 |
| 5,727,642 A | 3/1998 | Abbott | 280/304.1 |
| 5,738,261 A | 4/1998 | Dula | 224/282 |
| 6,029,312 A | 2/2000 | Whitney | 15/347 |
| 6,073,942 A | 6/2000 | Heneveld | 280/33.991 |
| 6,371,498 B2 | 4/2002 | Lundh | 16/44 |
| 6,478,203 B2 * | 11/2002 | Burns | B60R 9/065 206/315.3 |
| 6,485,243 B1 | 11/2002 | Ferman | 224/520 |
| 6,502,847 B1 | 1/2003 | Greaves | 20/491.1 |
| 6,698,770 B2 | 3/2004 | Eriksson | 280/33.991 |
| 6,715,774 B2 | 4/2004 | Cassoni | 224/274 |
| 6,729,114 B2 | 5/2004 | Fillman | 180/65.1 |
| 6,739,604 B2 | 5/2004 | Cassoni | 224/274 |
| 6,764,092 B1 | 7/2004 | Greaves | 280/402 |
| 7,044,344 B2 * | 5/2006 | Winkler | A63B 71/00 224/274 |
| 7,341,417 B1 | 3/2008 | Lohr | 224/506 |

(Continued)

OTHER PUBLICATIONS

Notice of Allowance issued in U.S. Appl. No. 14/818,656, dated Feb. 13, 2017 (8 pgs).

(Continued)

*Primary Examiner* — Hau V Phan
(74) *Attorney, Agent, or Firm* — Hayes Soloway P.C.

(57) ABSTRACT

A trailer to vehicle laterally stable hitching mechanism wherein an attaching plate of the trailer vertically and laterally self-aligns into a receiving plate of the vehicle establishing the trailer as an operational extension of the vehicle.

11 Claims, 11 Drawing Sheets

(56) References Cited

U.S. PATENT DOCUMENTS

| | | | |
|---|---|---|---|
| 7,487,895 B2 * | 2/2009 | Hesmer | B60R 9/06 |
| | | | 224/519 |
| 7,641,235 B1 | 1/2010 | Anduss | 280/47.34 |
| 7,984,916 B2 | 7/2011 | Schwager | 280/62 |
| 8,132,997 B2 | 3/2012 | Reuille | 224/537 |
| 8,162,192 B1 | 4/2012 | Sanchez | 224/521 |
| 8,833,788 B2 | 9/2014 | Chaddock | 280/414.5 |
| 9,643,669 B1 * | 5/2017 | Clark | B60D 1/363 |
| | | | 280/500 |
| 2012/0298435 A1 | 11/2012 | Jaffrezic | 180/68.5 |

OTHER PUBLICATIONS

Office Action issued in U.S. Appl. No. 14/818,656, dated Apr. 14, 2016 (7 pgs).
Office Action issued in U.S. Appl. No. 14/818,656, dated Jan. 6, 2016 (10 pgs).
Office Action issued in U.S. Appl. No. 14/818,656, dated Jun. 2, 2016 (8 pgs).
Office Action issued in U.S. Appl. No. 14/818,656, dated Sep. 19, 2016 (7 pgs).
Undated images (5 pgs).

* cited by examiner

FIG. 1A
FIG. 1B
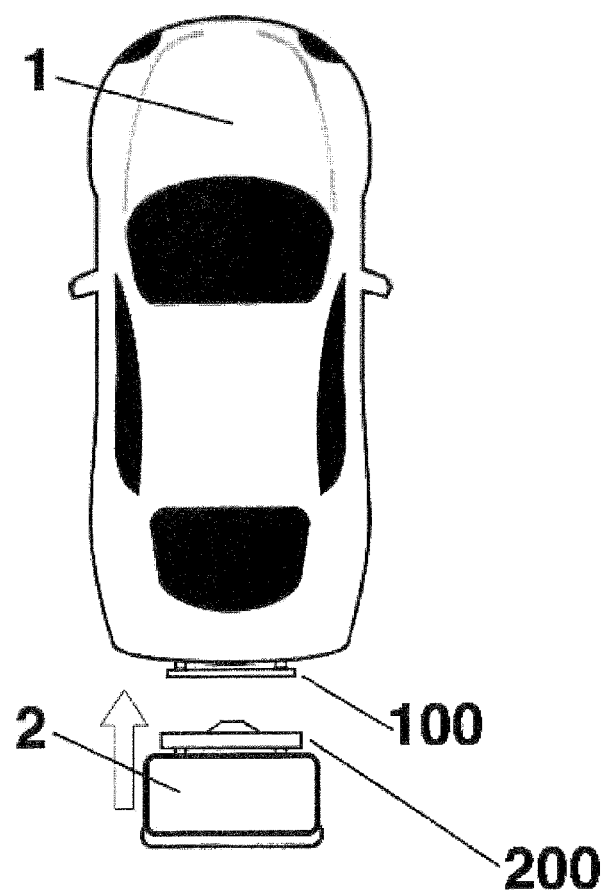
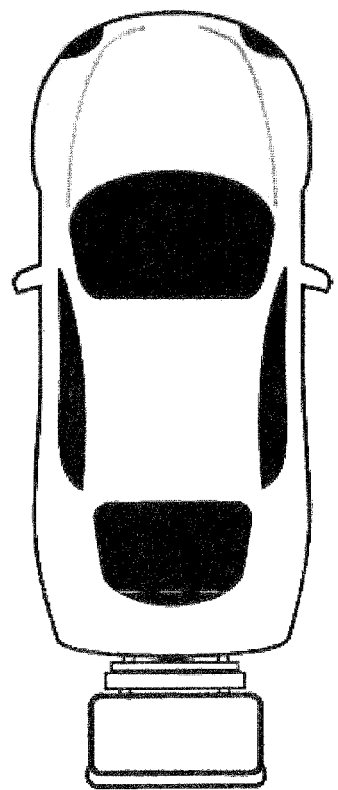

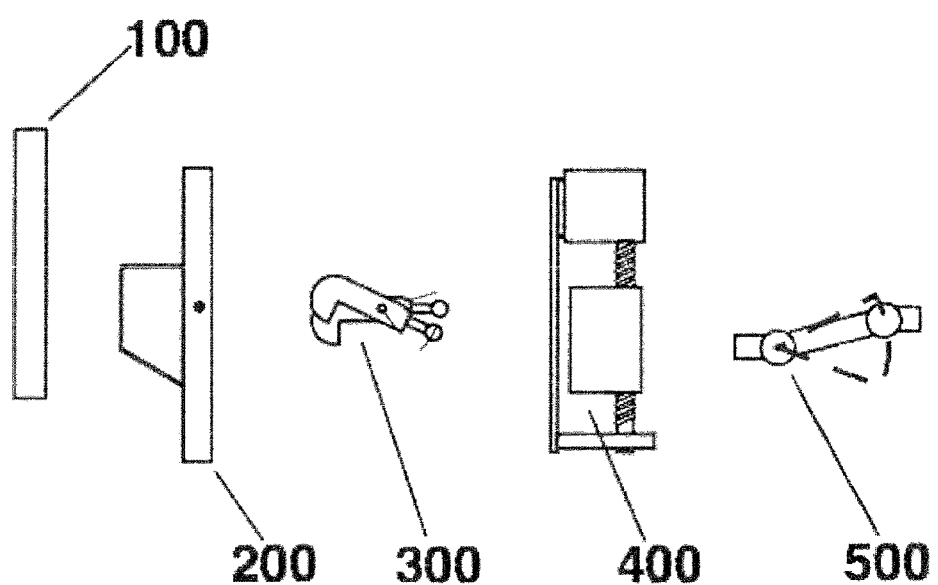

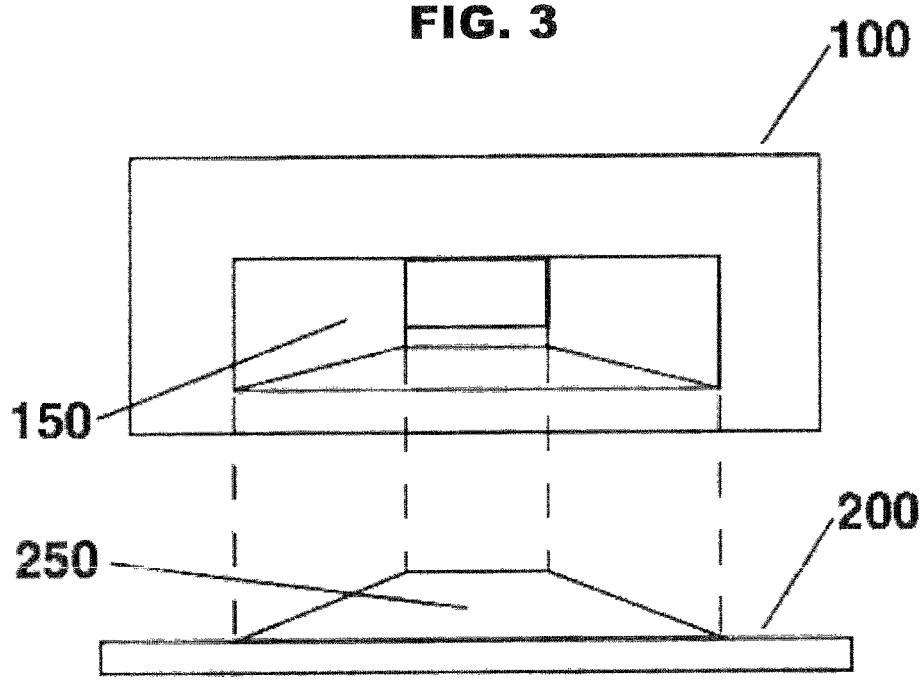
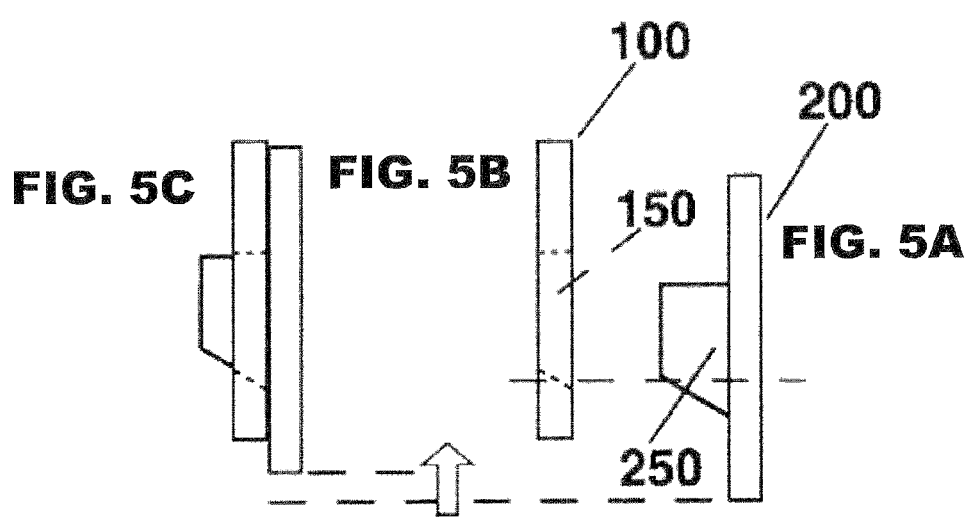

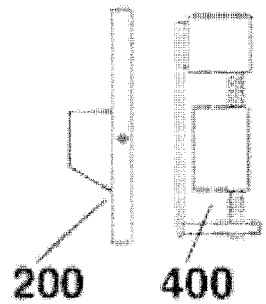  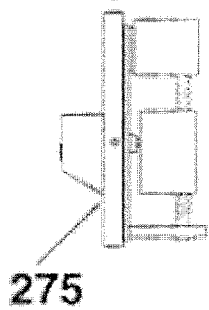 
FIG. 9C  FIG. 9B  FIG. 9A
275   200   400   300
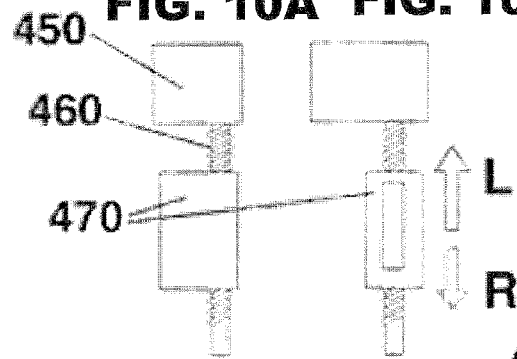
FIG. 10A  FIG. 10B
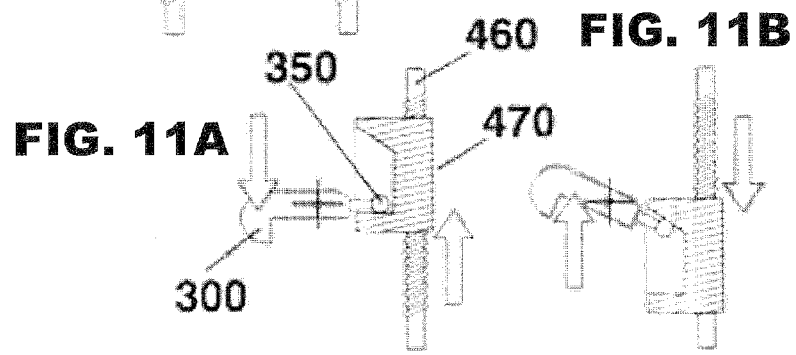
FIG. 11A  FIG. 11B
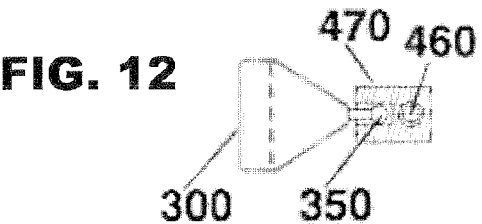
FIG. 12

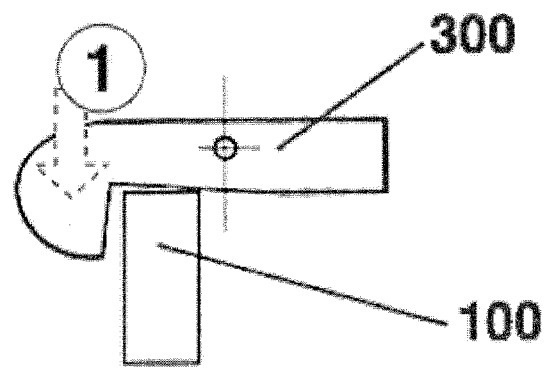
FIG. 13A
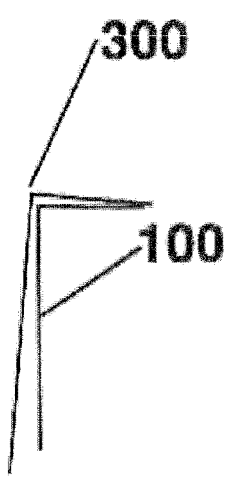
FIG. 13B2
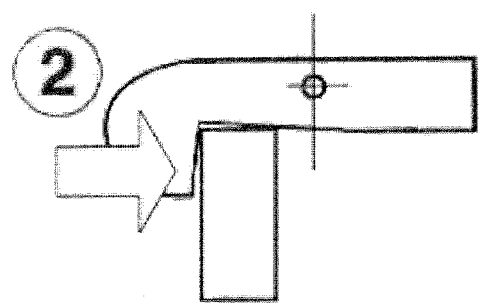
FIG. 13B1
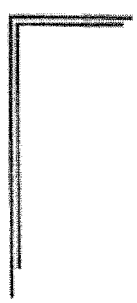
FIG. 13C2
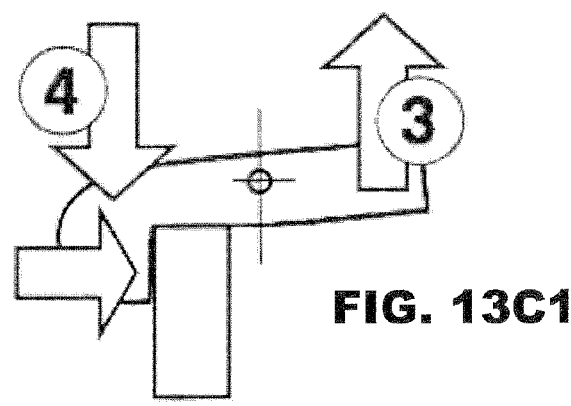
FIG. 13C1

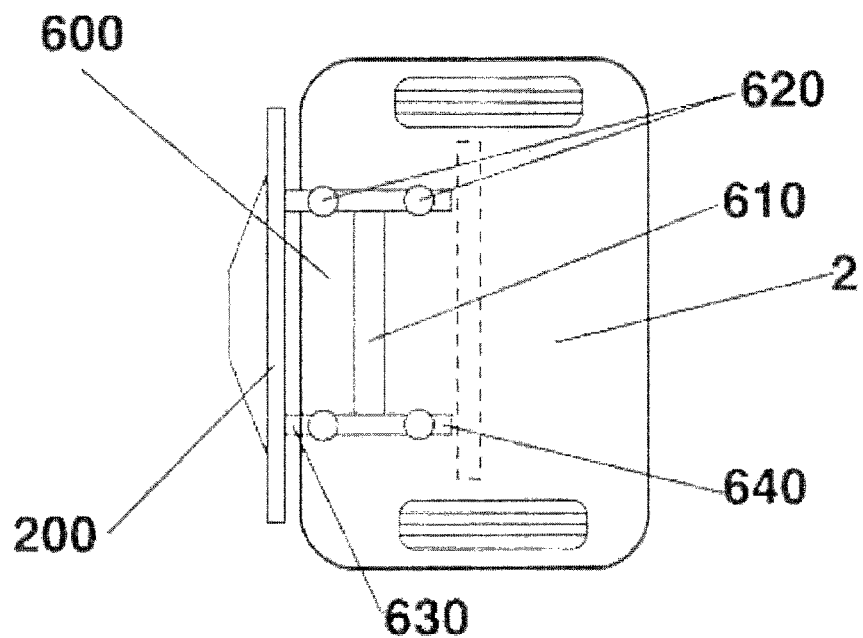
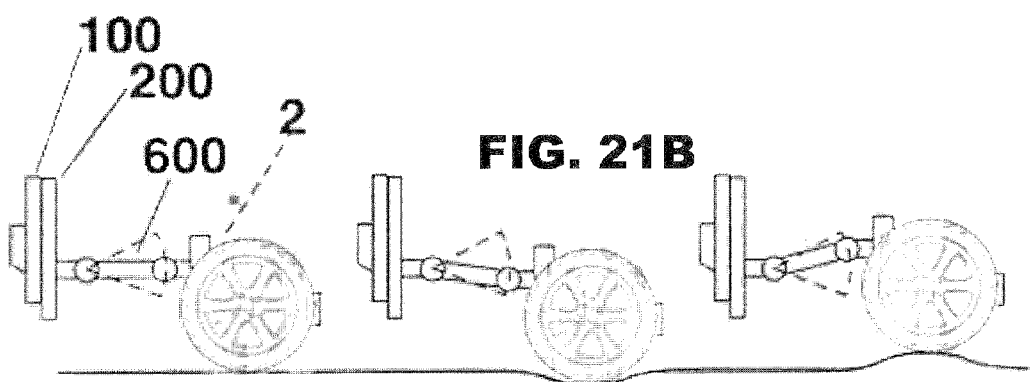

SELF-ALIGNING WHEELED TRAILER CONNECTING MECHANISM

CROSS-REFERENCE TO RELATED APPLICATIONS

This application is a continuation-in-part of U.S. application Ser. No. 14/818,656, filed Aug. 5, 2015, the contents of which are incorporated herein by reference.

BACKGROUND

Field

The present disclosure is directed to improvements in connecting trailers to vehicles. The disclosure is particularly applicable to connecting wheeled trailers to wheeled vehicles in a laterally-stable manner so as the trailers functionally become extensions of the vehicles and will be described in connection with such utility, although other utilities are contemplated.

SUMMARY OF THE DISCLOSURE

The present disclosure provides an attachable wheeled trailer that features an attaching plate on the trailer that self-aligns into a receiving plate on the vehicle such that vertical and lateral self-alignments are enabled by a wedge feature of the trailer's attaching plate. Such a wedge-alignment system would require only a single axial effort by a person manually pushing the trailer into attachment with a vehicle. Also provided is a method for the self-aligning attachment of a trailer to a vehicle using a laterally stable attachment of a trailer to a vehicle.

In one aspect of the disclosure there is provided a trailer to vehicle attachment mechanism comprising an attaching plate of the trailer, which attaching plate is adapted to vertically and laterally self-align into a receiving plate of the vehicle as the trailer and vehicle are brought together.

In another aspect, the aligning wedge installs into a guiding space of a receiving plate.

In still yet another aspect, the attachment mechanism further comprises a latch adapted to freely lift up over a guiding surface of the receiving plate and to then fall into latching grasp of the receiving plate.

In a further aspect, the latch is adapted to be engaged by a powered device adapted to force the latch into structural locking with the receiving plate.

In a still further aspect, the latch is adapted to be engaged by a powered device adapted to force the latch out of structural connection of the receiving plate.

The present disclosure also provides an attachment mechanism as above described, installed on a trailer by a laterally stable but vertically accommodating device adapted to allow the trailer to independently maneuver vertically from it's attachment to a vehicle.

Also provided is a method of attaching a trailer to a vehicle, comprising: providing a trailer with an attaching plate as above described; providing a vehicle with a receiving plate as above described; and bringing the trailer and vehicle together, whereupon the attaching plate of the trailer and the receiving plate of the vehicle vertically and laterally self-align.

In one aspect of the method the aligning wedge installs into a guiding space of a receiving plate.

In another aspect of the method, the attachment mechanism further comprises a latch adapted to freely lift up over a guiding surface of the receiving plate and to then fall into latching grasp of the receiving plate.

In still another aspect of the method the latch is adapted to be engaged by a powered device adapted to force the latch into structural locking with the receiving plate.

In still yet another aspect of the invention the latch is adapted to be engaged by a powered device adapted to force the latch out of structural connection of the receiving plate.

In yet another aspect of the method, the attachment mechanism is installed on a trailer by a laterally stable but vertically accommodating device adapted to allow the trailer to independently maneuver vertically from it's attachment to a vehicle.

BRIEF DESCRIPTION OF THE SEVERAL VIEWS OF THE DRAWINGS

Further features and advantages of the present disclosure shall be seen from the following detailed description, taken in conjunction with the accompanying drawings, wherein like numerals depict like parts, and wherein:

FIGS. 1A and 1B present a battery-powered vehicle receiving the attachment of a range enabler so as to be driven away from it's battery-only driving range as a maximally fuel efficient ICE vehicle.

FIG. 2 is an exploded view of the several components of the attachment mechanism of this disclosure.

FIG. 3 is a front view of the connecting face of a vehicle's receiving plate.

FIG. 4 is a top view of a compliant range-enabler's attaching plate.

FIGS. 5A-5C show how the independent attaching plate and receiving plate and the plates fit together as a combined structure.

FIGS. 9A-9C demonstrate the assembly of the components of the attaching plate assembly of this disclosure.

FIGS. 10A and 10B demonstrate the powered locking and releasing functionality of the activator module of the attaching plate assembly.

FIGS. 11A and 11B demonstrate the powered locking and releasing functionality of the latch of the attaching plate assembly.

FIG. 12 is top view of the latch and the actuator module of the attaching plate assembly.

FIGS. 13A-13C2 demonstrate the powered locking functionality of the attaching plate latch to the receiving plate of the connection mechanism of this disclosure.

FIG. 20 is a top view an attaching plate installed to a possible trailer by means of the vertically-accommodating yoke of the connection mechanism.

FIGS. 21A-21C demonstrate road irregularity accommodation of a suggested trailer enabled by being installed to it's attaching plate by the yoke of the connection mechanism.

DETAILED DESCRIPTION

Figure 6D:
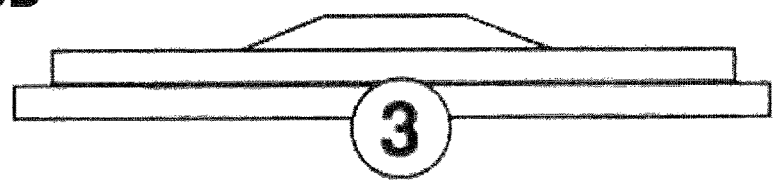
FIGS. 6A-6D demonstrate the lateral self-alignment functionality of an attaching plate to a receiving plate.

FIG. 1A presents a battery-powered vehicle 1 featuring an installed receiving plate 100 of this disclosure, awaiting the attachment of range-enabler vehicle attachment 2 featuring an installed attaching plate 200.

FIG. 1B demonstrates the now range-enabled vehicle driving away as a range enabled electric vehicle.

FIG. 2 is an exploded view of the several components of the disclosed self-aligning attachment mechanism, including a receiving plate 100, an attaching plate 200, a latch 300, an actuator module 400, and a vertically-adaptive yoke frame 500. The latching functionality of the latch is demonstrated.

FIG. 3 is a front view of receiving plate 100 featuring receiving socket 150.

FIG. 4 is a top view of attaching plate 200 featuring aligning wedge 250.

FIGS. 5A-5C show the vertical aligning functionality of aligning wedge 250 of attaching plate 200 in receiving socket 150 of receiving plate 100.

FIG. 5A is a side view of attaching plate 200 and aligning wedge 250.

FIG. 5B is a side view of receiving plate 100.

FIG. 5C is a side view of the two plates fitted together as a combined structure.

FIGS. 6A-6D are a demonstration of the lateral aligning functionality of aligning wedge 250 of attaching plate 200 installing in receiving socket 150 of receiving plate 100.

Figure 6C:
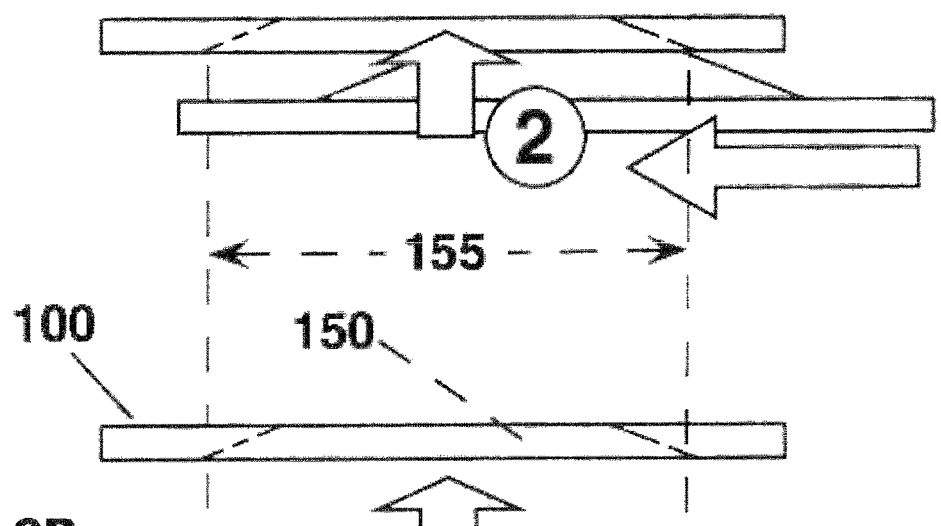
Figure 6B:
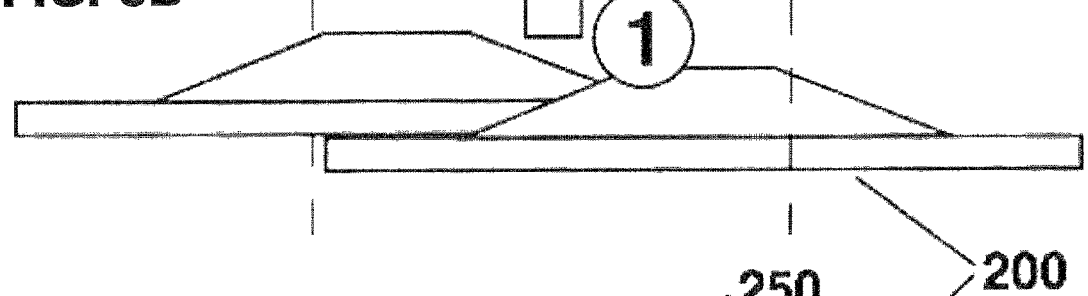
Figure 6A:
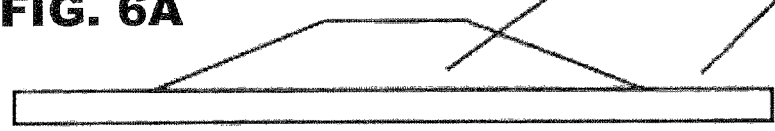

FIG. 6A is a top view of aligning plate 200 and aligning wedge 250.

FIG. 6B presents the range of lateral acceptance 155 of receiving socket 150. In action 1, an attaching plate is seen at the lateral extremes of it's compliance with receiving socket 150. As long as an approaching attaching plate is located within the socket's lateral range of acceptance it can proceed to laterally self-align into the receiving plate receiving socket.

FIG. 6C action 2 demonstrates the attaching plate laterally self-aligning itself into the receiving plate's receiving socket.

FIG. 6D action 3 demonstrates the attaching plate having laterally self-aligned itself into the receiving plate.

Figure 7:
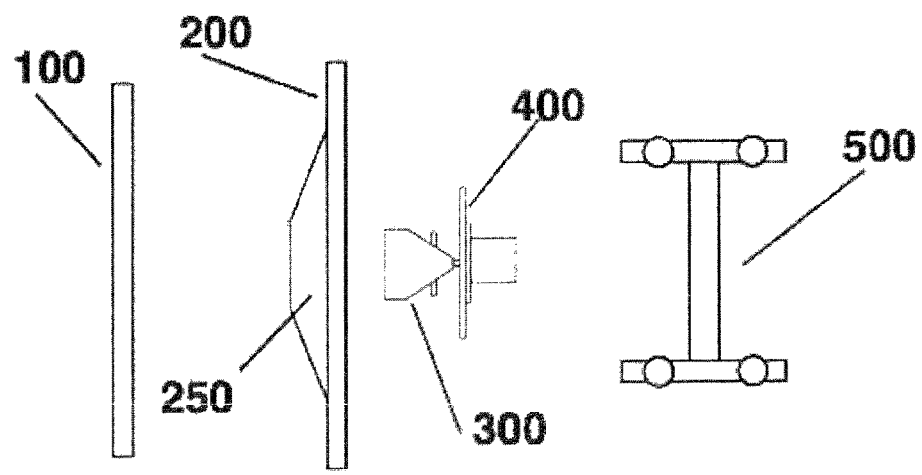
FIG. 7 is an exploded view of the several components of the disclosed connecting mechanism.

FIG. 7 is an exploded view of the several components of the disclosed attaching system, being a receiving plate 100, an attaching plate 200 featuring aligning wedge 250, a latch 300, an actuator module 400, and a vertically-adaptive yoke 500.

Figure 8:
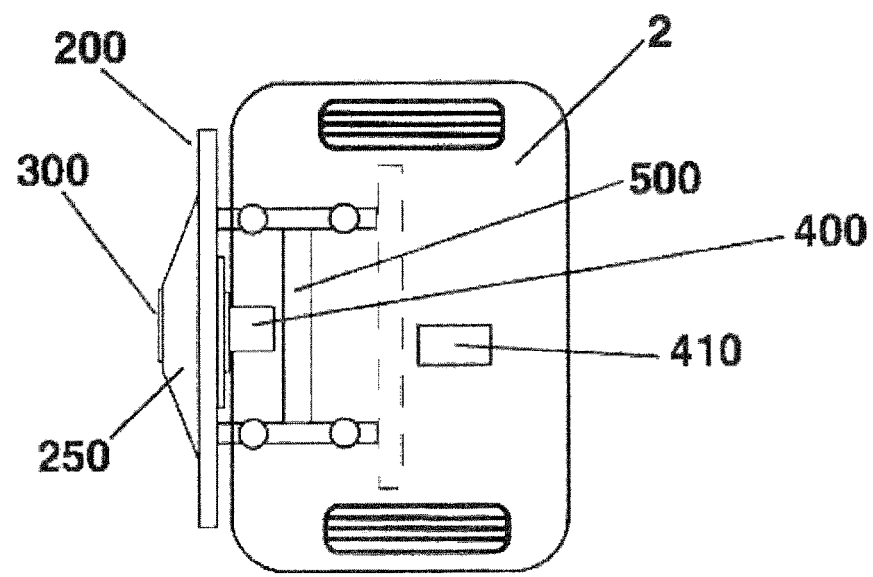
FIG. 8 illustrates a possible range enabler vehicle with it's related connecting mechanism components installed.

FIG. 8 is a top view of a possible trailer 2 with it's related attachment system components installed. Attaching plate 200 featuring aligning wedge 250 is seen as structurally installed to a possible trailer 2 by vertically-adaptive yoke 500. Installed to attaching plate 200 is an assembly of latch 300 and actuator module 400. Actuator-powering battery 410 is contained within trailer 2.

FIG. 9A-9C demonstrate the assembly of the components of attaching plate assembly 275.

FIG. 9A identifies in side views attaching plate 200, latch 300, and actuator module 400. Latch 300A is indicated as being freely rotatable around a pivot hole, and 300B is a top view of the latch.

FIG. 9B demonstrates the latch installed to the attaching plate.

FIG. 9C demonstrates the actuator module installed to that initial assembly resulting in attaching plate assembly 275.

FIG. 10A is a side view of the operational components of the attaching plate assembly: rotary actuator 450, screw drive 460, and socket manipulator 470.

FIG. 10B is a front view of the components in which the socket's operational recess is seen, and the socket's operational positions of down to lock (L) the latch and up to release (R) are demonstrated.

FIGS. 11A and 11B are cutaway side views of screw drive 460 vertically positioning socket manipulator 47 seen in cutaway view.

FIG. 12 presents latch 300 with it's engagement ball 350 installed into the recess of the socket. Demonstrated is the socket forcing the latch engagement ball up and the latch thus rotating on it's pivot hole to drive the connecting end of the latch down.

FIG. 11B demonstrates the socket pushing the latch engagement ball down and so lift the connecting end of the latch up.

FIG. 12 is a top view of latch 300 with it's engagement ball 350 installed into a cutaway view of socket manipulator 470 powered by screw drive 460.

FIGS. 13A-13C2 are conceptual side views of the powered locking of a simplified latch 300 of this disclosure to a simplified receiving plate 100.

FIG. 13A demonstrates the latch having loosely fallen by gravity (1) onto the plate.

FIG. 13B1 demonstrators the forward installing force of the latch having been removed, the now dead weight of the attaching assembly pulls the latch back against the face of the plate (2). This latching keeps the attaching plate from falling out from the receiving plate.

FIG. 13B2 illustrates the purposely designed angular displacement of the contact faces of latch 300 and receiving plate 100 when the latch is gravity only loosely positioned on the plate.

FIG. 13C1 demonstrates force (3) pushing up on the activating end of the latch that robustly pushes the latching end down (4) onto the receiving plate that results in the rotational resolution of the angular displacement of the two contacting faces into structural full contact of the latch to the plate as illustrated in 13C2.

Figure 14:
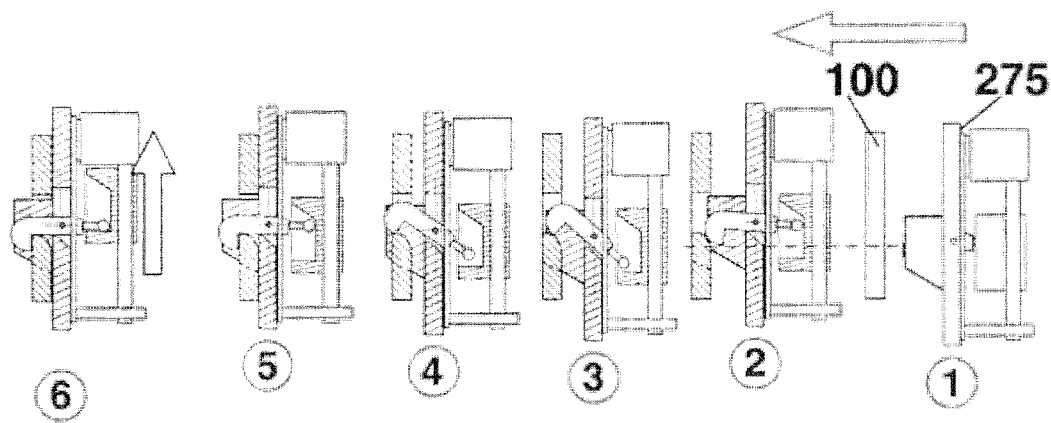
FIG. 14 demonstrates the operational steps of the latch grasping the receiving plate of the connection mechanism.

FIG. 14 demonstrates cutaway side views of the operational steps in the latching and locking functionality of an attaching plate to a receiving plate.

FIG. 14-1 presents attaching plate assembly 275 approaching receiving plate 100. The vertical position of the attaching plate assembly is indicated as being within the lower level of acceptance of the receiving plate.

FIG. 14-2 demonstrates the latch of the installing attaching plate assembly making first contact with the accommodating lower edge of the receiving socket of the receiving plate.

FIG. 14-3 demonstrates the forward pressure of the installing attaching plate forcing the latch edge of the assembly lifting along the contour of the receiving socket of the receiving plate.

FIG. 14-4 demonstrates the latch following the receiving contour of the receiving plate as the attaching plate approaches full face contact with the receiving plate.

FIG. 14-5 demonstrates that when the two plates do make final contact, the latch by gravity falls into latching contact with the receiving plate. This free falling contact by the latch is by necessity a slightly loose grasp of the receiving plate, but structurally sufficient to allow the installing force on the attaching plate assembly to be removed. The latch will prevent the attaching plate assembly from falling out of the receiving plate.

FIG. 14-6 demonstrates the final powered locking of the attaching plate assembly to the receiving plate.

Figure 15:
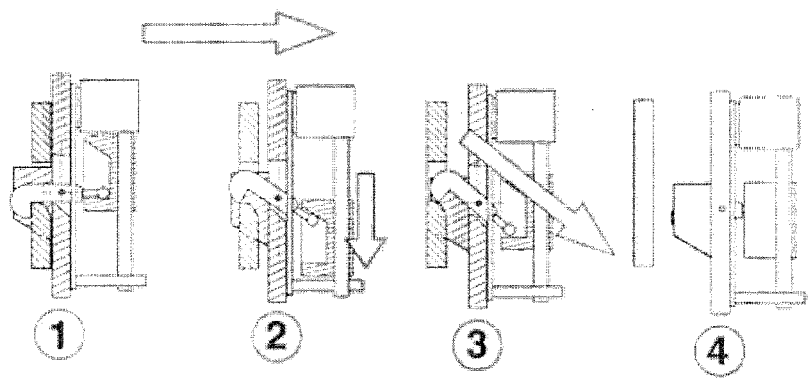
FIG. 15 demonstrates the operational steps of the release of the latch from the receiving plate of the connection mechanism.

FIG. 15 demonstrates cutaway side views of the operational steps in the releasing of an attaching plate from a receiving plate.

FIG. 15-1 presents attaching plate assembly 275 as structurally locked to receiving plate 100.

FIG. 15-2 demonstrates the socket manipulator powering down on the latch engaging ball to push it's gripping end up and free from it's receiving plate, that will allow, FIG. 15-3 the attaching plate assembly falling out of the receiving plate.

FIG. 15-4 suggests that the attaching plate as a component of a trailer, the trailer has fallen back onto the ground as an again independent vehicle.

Figure 16:
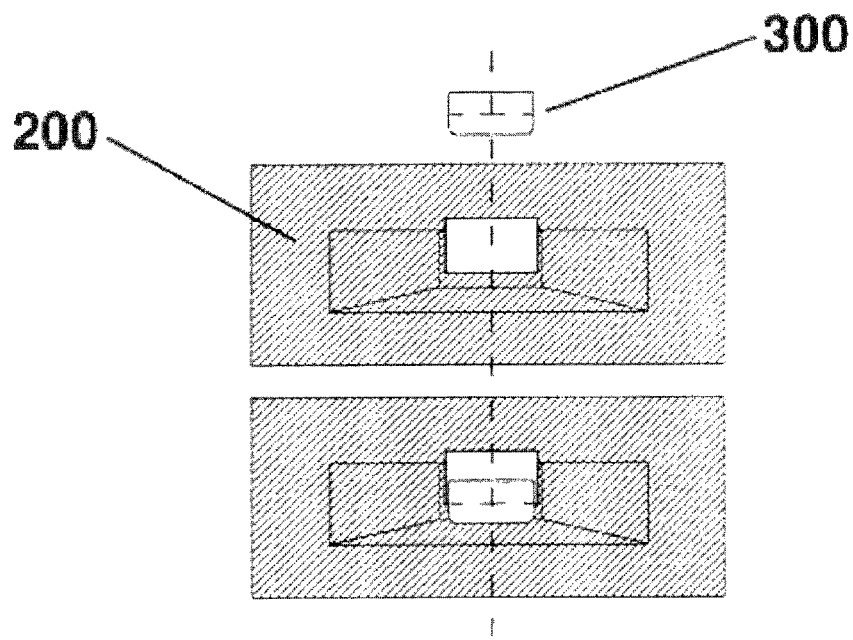
FIG. 16 is a front view of the connecting face of attaching plate demonstrating the installation of the latch in the attaching plate.

FIG. 16 is front views of attaching plate 200 and latch 300. The latch is shown operationally located in the attaching plate.

Figure 17:
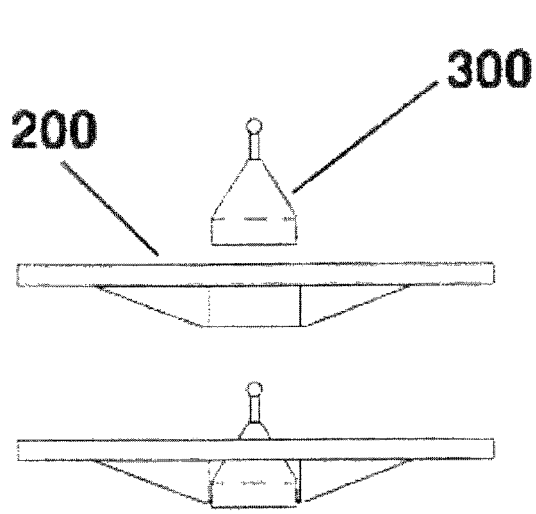
FIG. 17 is a top view of the location of the latch in the attaching plate.
Figure 18:
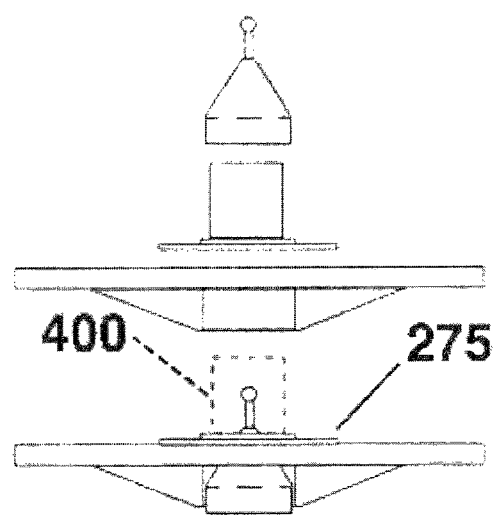
FIG. 18 is a top view of the assembly of the components of the attaching plate assembly of the disclosed connection mechanism.

FIG. 17 is a top view of attaching plate 200 and latch 300. The latch is shown operationally located in the attaching plate.

Figure 19:
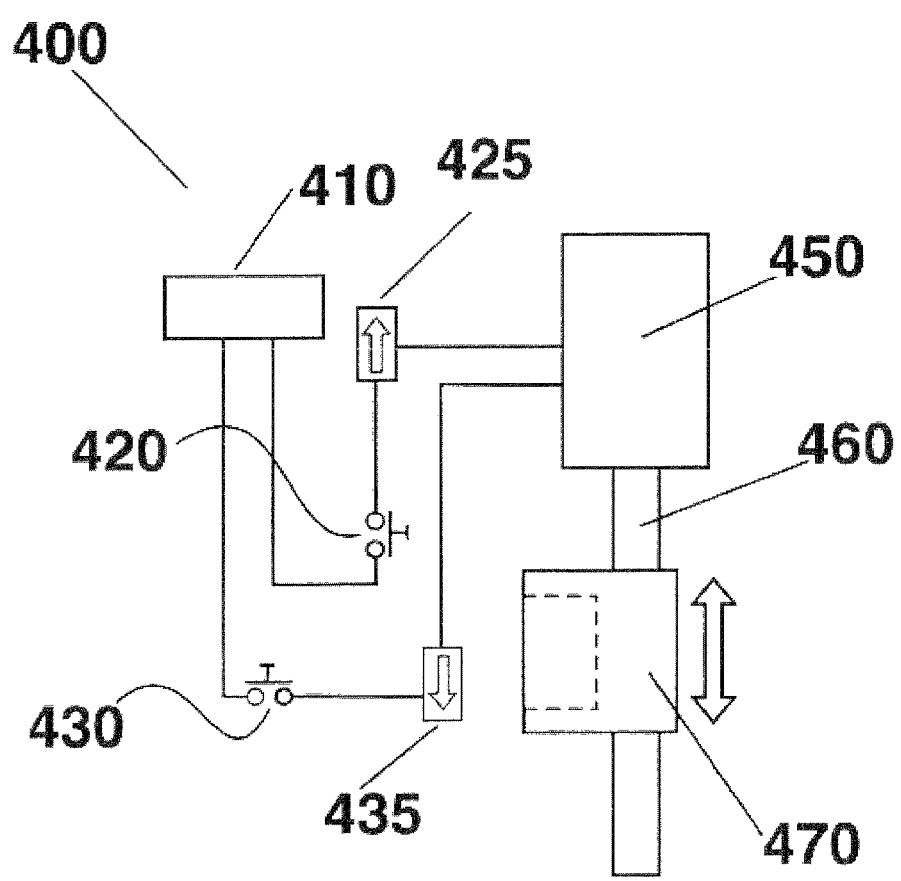
FIG. 19 is an operational schematic of the actuator module of the connection mechanism.

FIG. 19 is an operational schematic of actuator module 400.

Rotary actuator 450 powers screw drive 460 that vertically positions socket manipulator 470.

An electric attaching plate locking sequence is initiated by appropriate sensor 420 of an attaching plate detecting contact with a receiving plate. The sensor is connected to electrical controller 425, and battery 410. Activated, the controller initiates a programed locking operation of rotary actuator 450 that produces a robust upward powering by screw drive 460 of socket 470 to push a latch into it's downward locking functionality.

An electric attaching plate releasing sequence is initiated by manually activating switch 430 on the body of an attached trailer of which the attaching plate is a component. The switch is connected to electrical controller 435, and battery 410. Activated, the controller initiates a programed downward releasing operation of socket 370.

The two indicated controllers may be functions of a single controller.

Demonstrated is a rotary actuator mechanism, but other actuator systems are possible.

FIG. 20 is a top view of a possible trailer 2 with an attaching plate 200 installed by means of vertically-adaptive yoke 500. The yoke is composed of frame 510 installing to vertically-accommodating links 520. Links 520 oppositely install to plate mounting arms 530 and trailer mounting anus 420.

The yoke installs the trailer to it's attaching plate so as to be able to vertically accommodate uneven road surfaces.

FIG. 21 is side views of the vertical accommodation of the wheels of an assumed trailer to the irregularities of a possible road surface.

FIG. 21A identifies vehicle receiving plate 100 structurally secured to trailer attachment plate 200 and yoke 500 vertically-accommodatingly installing a possible trailer 2. (For clarity of concept, only the wheeled frame of such a trailer is illustrated).

FIG. 21B demonstrates the downward accommodation of a trailer to a road irregularity.

FIG. 21C demonstrates the upward accommodation of a trailer to a road irregularity.

DRAWINGS—REFERENCE NUMERALS

1 Battery-Powered Vehicle
2 Trailer
100 Receiving Plate
150 Receiving Socket
155 Range of Lateral Acceptance of Receiving Socket
200 Attaching plate
250 Aligning Wedge
275 Attaching Plate Assembly
300 Latch
350 Latch Engaging Ball
400 Actuator Module
410 Battery
420 Contact Switch
425 Locking Controller
430 Manual Switch
435 Releasing Controller
450 Rotary Actuator
460 Screw Drive
470 Socket Manipulator
500 Vertically-Accommodating Yoke Frame
510 Frame
520 Vertically-Accommodating Link
530 Plate Mounting Arm
540 Trailer Mounting Arm

The invention claimed is:

1. A trailer hitch for attaching a trailer to a vehicle, comprising:
an attaching plate adapted for attachment to a trailer, and a receiving plate adapted for attachment to a vehicle;
the attaching plate having an aligning wedge having tapered side walls on opposite sides and a tapered bottom wall extending therefrom;
the receiving plate having a socket having tapered side walls on opposite sides and a tapered bottom wall adapted for accommodating the attaching plate aligning wedge; and
a pivotally mounted J-shaped latch carried on the attaching plate and adapted to extend over an edge of the receiving plate when the attaching plate and the receiving plate are brought together.

2. The trailer hitch of claim 1, wherein the aligning wedge installs into a guiding space of a receiving plate.

3. The trailer hitch of claim 1, wherein the latch is adapted to be engaged by a powered device adapted to force the latch into structural locking with the receiving plate.

4. The trailer hitch of claim 1, wherein the latch is adapted to be engaged by a powered device adapted to force the latch out of structural connection of the receiving plate.

5. The trailer hitch of claim 1, wherein the attaching plate has a vertically accommodating device adapted to allow the trailer to independently maneuver vertically from it's attachment to the vehicle.

6. A method of attaching a trailer to a vehicle, comprising:
providing a trailer with an attaching plate having a aligning wedge having tapered side walls and a tapered bottom wall extending therefrom;

providing a vehicle with a receiving plate having a socket having tapered side walls on opposite sides and a tapered bottom wall adapted to accommodate the attaching plate tapered side walls on opposite sides and tapered bottom wall; and bringing the trailer and vehicle together, whereupon the attaching plate of the trailer and the receiving plate of the vehicle vertically and laterally self-align.

7. The method of claim 6, wherein the aligning wedge installs into a guiding space of a receiving plate.

8. The method of claim 6, wherein the latch is adapted to freely lift up over a guiding surface of the receiving plate and to then fall into latching grasp of the receiving plate.

9. The method of claim 6, wherein the latch is adapted to be engaged by a powered device adapted to force the latch into structural locking with the receiving plate.

10. The method of claim 6, wherein the latch is adapted to be engaged by a powered device adapted to force the latch out of structural connection of the receiving plate.

11. The method of claim 6, wherein the attaching plate has a vertically adjustable accommodating device, and adjusting the vertically accommodating device to independently maneuver the trailer vertically from it's attachment to a vehicle.

* * * * *